United States Patent [19]

Wood

[11] 4,128,948
[45] Dec. 12, 1978

[54] METHOD AND APPARATUS FOR GRAIN DRYING AND STORAGE

[76] Inventor: Gary F. Wood, 615 N. Broadway, Hobart, Okla. 73065

[21] Appl. No.: 579,454

[22] Filed: May 21, 1975

[51] Int. Cl.² .............................................. F26B 3/28
[52] U.S. Cl. ........................................... 34/33; 34/93; 34/181; 34/205; 126/270
[58] Field of Search .................. 34/93, 179, 180, 181, 34/205, 33, 237, 232, 243 R; 432/62; 165/45; 214/17 A, 17 C, 17 CA, 17 DB; 52/90, 169; 126/270

[56] References Cited

U.S. PATENT DOCUMENTS

| | | | |
|---|---|---|---|
| 1,903,510 | 4/1933 | Labdon et al. | 34/93 |
| 2,428,876 | 10/1947 | Hawkins | 126/270 |
| 2,571,277 | 10/1951 | Morrow | 214/17 C |
| 3,182,859 | 5/1965 | Harris et al. | 214/17 C |
| 3,312,022 | 4/1967 | Marriage | 52/169 |
| 3,727,556 | 4/1973 | Adams | 34/102 |
| 3,894,345 | 7/1975 | Zeltmann | 126/270 |

FOREIGN PATENT DOCUMENTS

912490  4/1943  France ........................... 34/93

Primary Examiner—John J. Camby
Assistant Examiner—Larry I. Schwartz
Attorney, Agent, or Firm—Robert M. Hessin

[57] ABSTRACT

A method for providing grain drying and storage utilizing an earth cavity of designated planar construction as covered by light transmitting housing assembly; the structure consisting of an earth cavity having inverted tetrahedral characteristic which is closed over by a light transmitting housing, the interior of the storage volume includes a plurality of conveyor means for circulating the fungible material placed therein as well as means for controlling the interior heat and auxiliary heat flow.

12 Claims, 5 Drawing Figures

METHOD AND APPARATUS FOR GRAIN DRYING AND STORAGE

BACKGROUND OF THE INVENTION

1. Field of the Invention

The invention relates generally to grain drying apparatus and, more particularly, but not by way of limitation, it relates to improved grain storage and drying methods and apparatus.

2. Description of the Prior Art

The prior art includes various types of housing assemblies for the purpose of grain drying. Generally speaking, the prior art forms of device have taken the form of above-ground structures, e.g., silo-type buildings, as outfitted with the necessary ventilation and heat application equipment. Such structures as have been used heretofore are necessarily costly of construction and difficult of maintenance due to the exigencies of the construction of stable buildings or housings above ground and provision of the requisite base or footing supporting structure associated therewith.

SUMMARY OF THE INVENTION

The present invention contemplates provision of a grain drying and storage apparatus wherein an inverted tetrahedral cavity is formed in the earth's surface and suitably lined to provide waterproofing as well as smooth surface; an above ground housing is then formed of light transmitting material over the cavity to provide an air excluding volume for the containment of drying grain while ancillary circulation and ventilation equipment is employed to control the interior volume environment.

Therefore, it is an object of the present invention to provide a grain storage and drying method which more effectively utilizes natural sun's radiation to effect grain drying.

It is also an object of the present invention to provide grain storage and drying apparatus which is capable of being constructed to contain larger volume with much lower construction costs.

It is yet another object of the invention to provide grain storage apparatus which is capable of controllably circulating large volumes of stored grain to facilitate drying.

Finally, it is an object of the present invention to provide a more effective method of drying grain at reduced costs.

Other objects and advantages of the invention will be evident from the following detailed description when read in conjunction with the accompanying drawings which illustrate the invention.

DETAILED DESCRIPTION OF THE INVENTION

Figure 1:
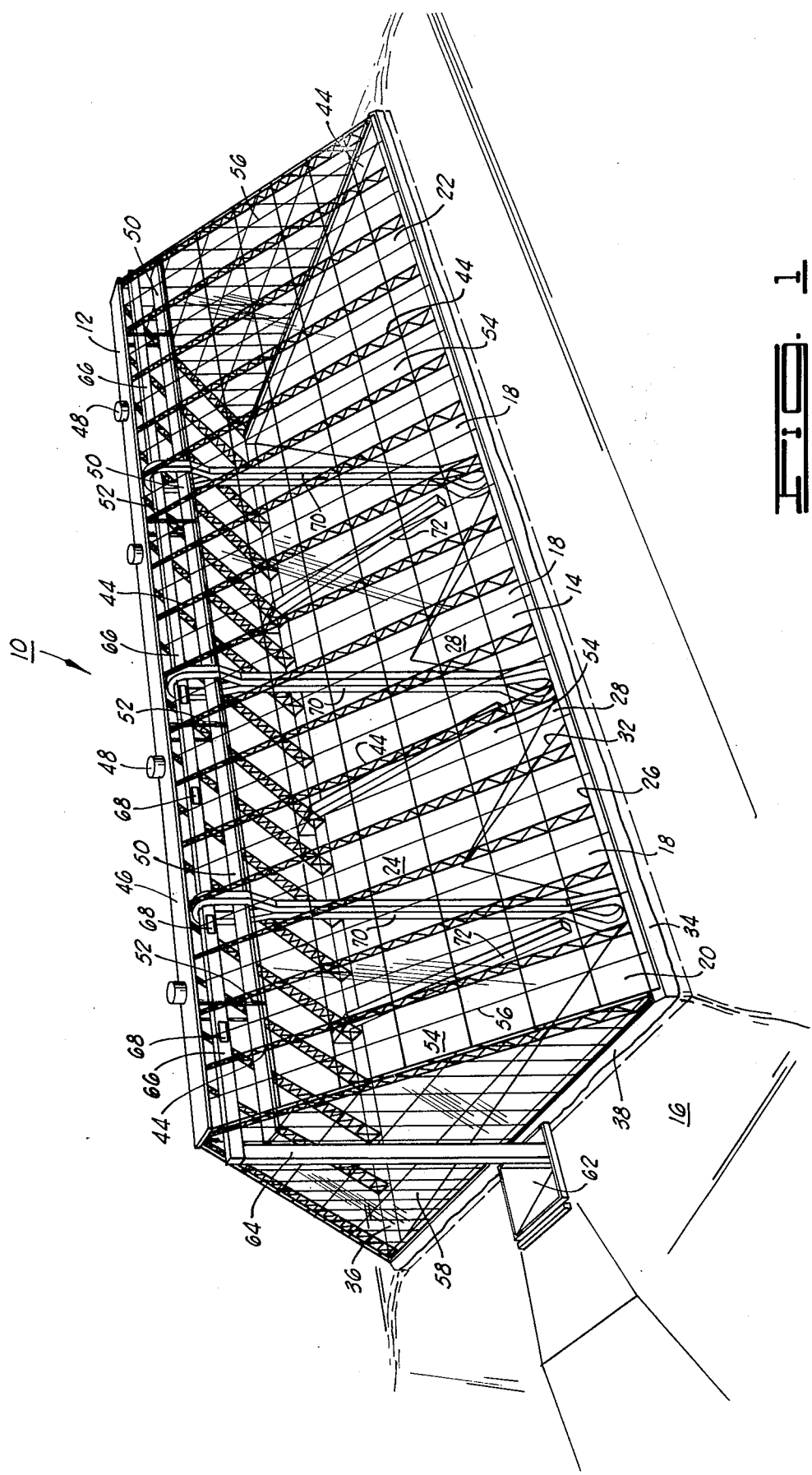
FIG. 1 is a perspective view of a grain drying apparatus as constructed in accordance with the present invention.
Figure 2:
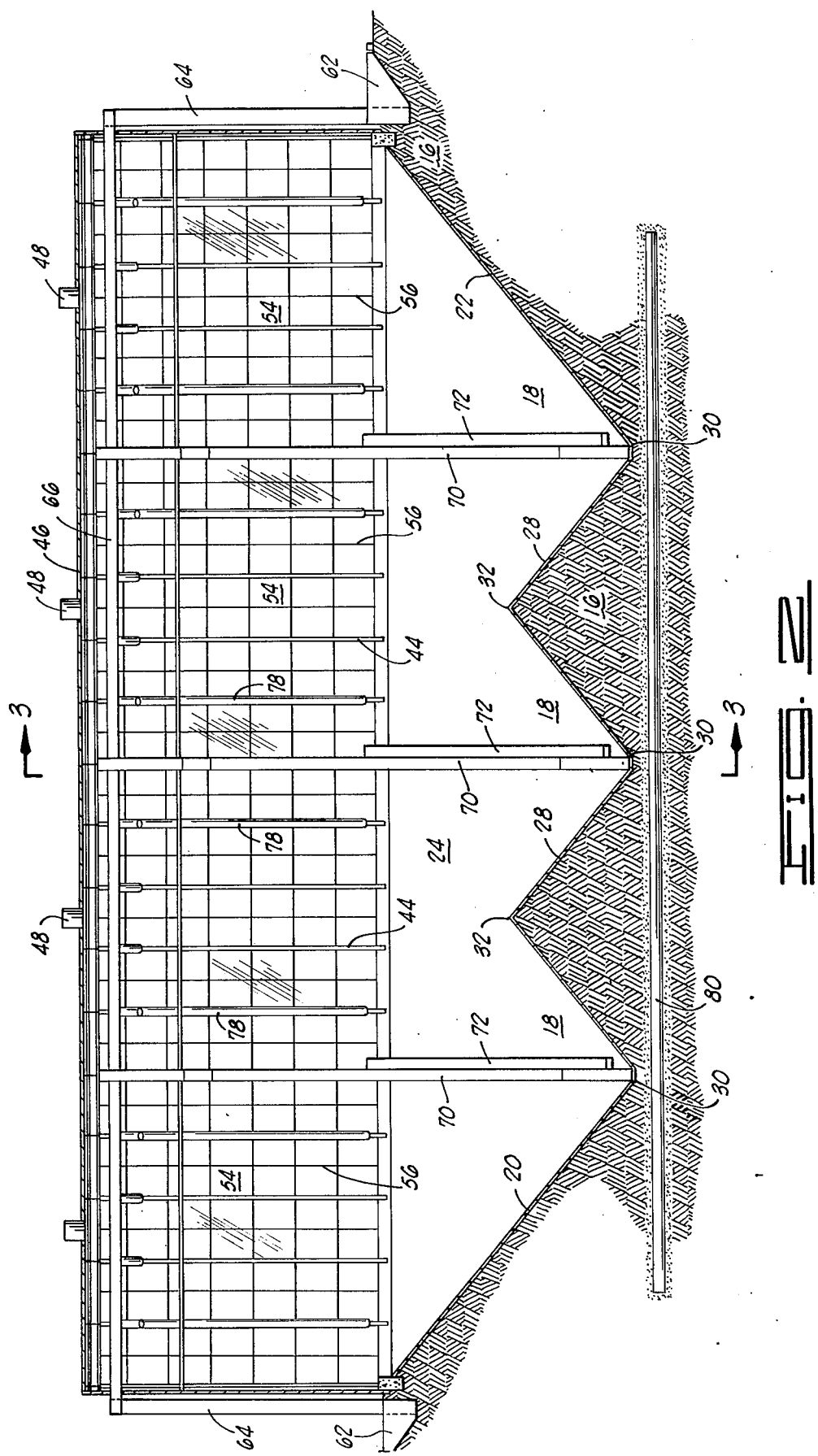
FIG. 2 is a vertical section through the length of the apparatus of FIG. 1.

As shown in FIG. 1, a storage housing 10 consists of a housing 12 which encloses a cavity 14 suitably formed downward within a section of earth 16. As shown also in FIGS. 2 and 3, the cavity 14 is formed as a series of successive inverted, regular tetrahedrons 18. Tetrahedrons 18 are formed by end walls 20 and 22 connected by side walls 24 and 26 and intermediate walls 28. Each of end walls 20 and 22, side walls 24 and 26 and intermediate walls 28 are planar and lying at an angle of approximately 40° relative to the horizontal as they join at the respective apices 30 of tetrahedral cavities 18. The angle of 40° is selected as one accommodating flow of all normally stored grains, e.g., the angle of repose for wheat of nominal dryness is approximately $33\frac{1}{3}°$. Thus, as each tetrahedral cavity 18 terminates in a lower apex 30, the intermediate wall surfaces 28 terminate in a transverse horizontal ridge 32.

The surfaces of cavity 14, i.e., all tetrahedral cavities 18, are formed to be of smooth surface thereby to enable ready flow of grain thereover. It is contemplated that in one aspect the inner wall surfaces of the tetrahedral cavities 18 will be covered with black felt material with proper waterproofing impregnation. A light gauge sheet metal lining may also be laid on the side walls of tetrahdral cavities 18 in order to maintain a smooth texture over an extended period of time; in which case, the additional black felt covering may or may not be utilized, depending upon the amount of heat absorption desired. Yet a more permanent installation is contemplated wherein the cavity 14 having its plurality of tetrahedral cavities 18 is entirely form constructed utilizing concrete of sufficient thickness and smooth outer surface.

Figure 3:
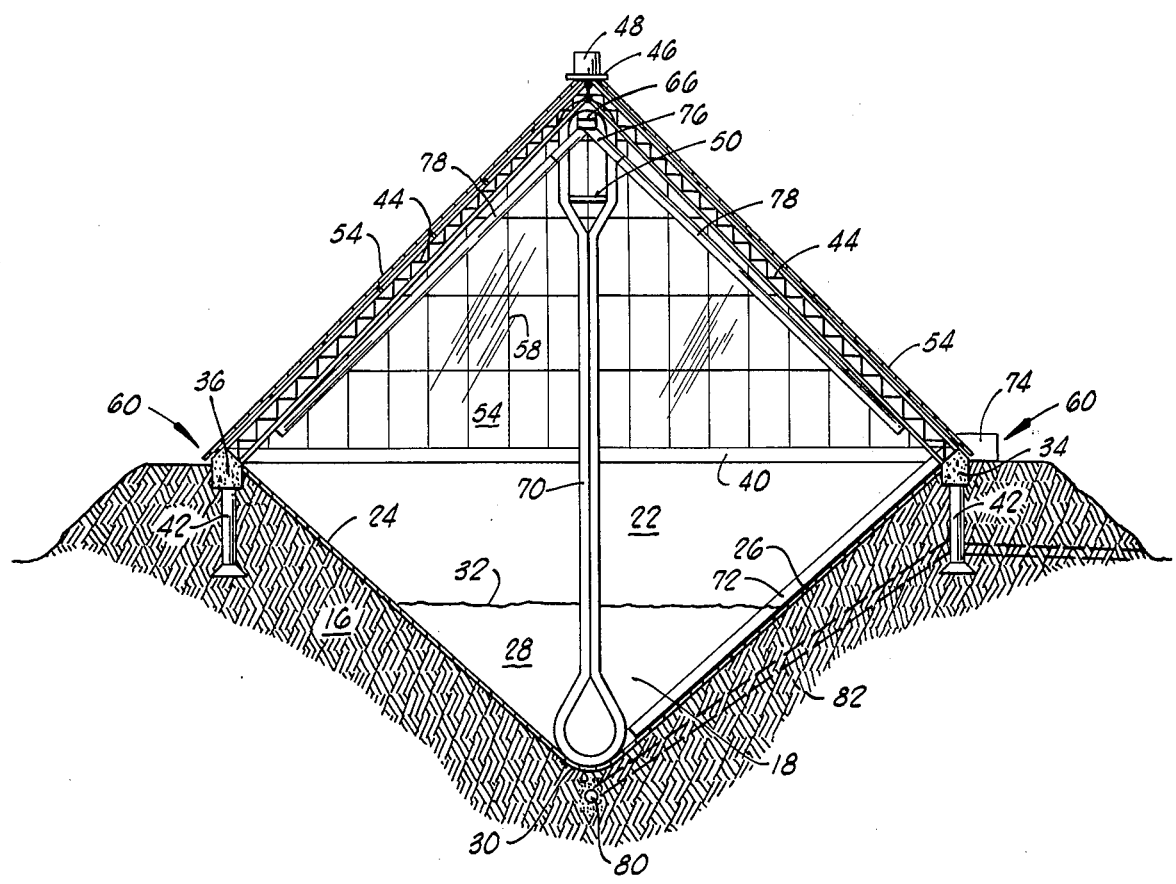
FIG. 3 is a transverse vertical section taken along lines 3—3 of FIG. 2.

The surface rim of the housing 18 is suitable formed of concrete, reinforced as necessary, forming side bases 34 and 36 and continuous end bases 38 and 40. As shown in FIG. 3, the base members 34 through 40 may be embellished and further strengthened by utilizing a plurality of base footing members 42 as periodically disposed, as required, about the circumfery of the base members. Also as shown in FIG. 3, base footing members 42 may be initially constructed to extend from ground level with later filling in of moved earth therearound for subsequent formation of the base members 34 through 40 and final formation of tetrahedral cavities 18.

The housing 12 may be formed by any usual construction method, economy versus strength being the equational factor, but a preferred form is shown in the drawings wherein a plurality of structurally rigid beams 44, e.g., metal open truss members, are extended in parallel from each of side base members 36 and 34 upward into suitable affixure along an upper ridge member 35. Ridge member 35 may consist of conventional structural techniques utilizing gusseting or the like to secure the upper end of respective pairs of beams 44, and rigid members 46 also serves as a rigid support member for a plurality of air exhausting blowers 48 disposed thereon as required. A catwalk 50 extends longitudinally beneath the ridge of housing 12 and may be supported by such as a plurality of hanger members 52 extending downward beneath ridge member 46. Catwalk 50 provides an access walkway for control and manipulation of interior conveyors, as will be further described below.

The entire exterior of upper housing 12 is then covered with one of the more recently developed clear plastic materials having sufficient rigidity and light transmissibility to enable proper function. For example, a recently developed sheet plastic known under the trademark "CORROLUX" is presently utilized and providing good functional capability. The light transmissive material is available in large panel sizes and can be easily installed in both the angled side as well as the vertical end surfaces of housing 12. Thus, if angular beams 44 are disposed at a six foot spacing, the large sheets of plastic panel 54 may be supported thereon and further consolidated by utilization of sealer stripping 56, also of well-known and commercially available type. The end walls of housing 12 are similarly constructed by butt joining plastic panels and securing with sealing stripping 56. It should also be understood that, depending upon the necessary strength and wind resistance requirements, stripping 56 may take the form of guide-type metal rods of selected strength which receive respective plastic panels therein in fastened affixure. As may be noted in FIG. 3, the cover panels 54 are preferably mounted to define a narrow opening 60 along the lower side thereof adjacent side base members 34 and 36 in order to allow cooling ventilation affecting the underside of panel members 54 thereby to avoid sweating or moisture collection thereon.

Grain conveyance is effected from hoppers 62, truck or trailer accessible, for upward conveyance along a vertical conveyor 64 and entry into a horizontal conveyor 66 which runs the length of the housing 12. Hoppers 62 and vertical conveyors 64 may be located at either or both ends of the housing 12. The horizontal conveyor 66 includes a plurality of slide hatches 68 disposed thereon and accessible from catwalk 50 to control the flow of grain for release anywhere along the length of housing 12.

Interior vertical conveyors 70, which may be a conventional chain conveyor, serve to move grain from apices 30 upward for disposal into horizontal conveyor 66 and controlled release at a selected location. That is, the upper end of conveyor 70 is in communication with horizontal conveyor 66 and serves to move grain from the very bottom of the respective tetrahedral cavities back upward for disposal on top of the grain aggregate. Each of the conveyors utilized is a commercially available form of conveyor driven by conventional means and such structures are available from the Buhler-Miag Corporation of Lincoln, Nebraska.

Air and/or auxiliary heat are introduced via the diagonal ducts 72 each extending into the apex of a respective tetrahedral cavity 18. While forced air ducts 72 are shown as extending in through one side of the storage housing 10, it should be well understood that they may be symmetrically disposed on each side thereof. In some situations it will be necessary to introduce additional heat down into the lower body of the stored grain and, therefore, each of ducts 72 is connected to a blower/heater 74 of commercially available type.

To further enhance the versatility of the system, a plurality of directing tubes 76 (see FIG. 3) are connected to the underside of horizontal conveyor 66 and are manipulatable to introduce down falling grain into selected ones of a plurality of fall ducts 78 which may be suitably supported from spaced ones of said beams 44. Thus, down falling grain from the upper ridge portion of housing 12 can be directed to the outer edges of the grain pile for further circulation down along the side walls as drawn by the cyclical movement of upward conveyor 70 gathering and moving grain from the apex 30.

It is also contemplated that drainage may be required in some installations, and it is proposed to place a tile dry well type of drainage extension 80 (see FIG. 2) along the underside of the storage housing 10. A further one or more ventilation ducts 82 may be connected from the drainage tiles 80 up to a suitable venting location as shown in FIG. 3.

Figure 4:
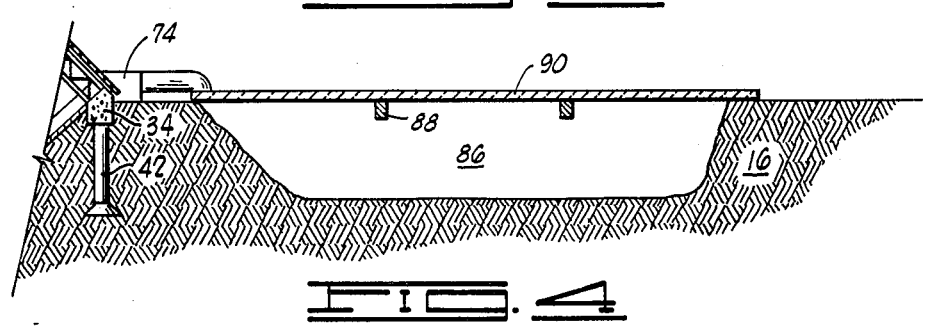
FIG. 4 is a sectional view of one form of auxiliary heat generator.
Figure 5:
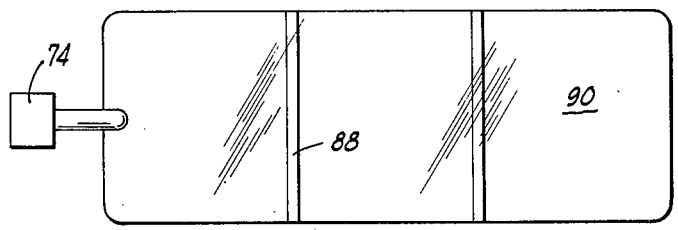
FIG. 5 is a top view of the structure of FIG. 4.

FIG. 4 discloses additional structure which may be utilized in generating heated air for periodic input via blower 74 and ducts 72 down to the apices 30 of the storage housing. An earth cavity 86 is formed in the earth adjacent blower 74 and covered over with suitable surface framing 88 in support of a light transmitting, clear plastic covering 90. The interior or earth cavity 86 is then connected via a duct 92 for communication with blower 74 which serves to pull heated air out of cavity 86 for introduction via ducts 72 to the apices 30 area of the storage housing 10. Thus, earth cavity 86, of whatever size required by the exigencies of the system, merely retains still air to be heated by incident sun through plastic panel or cover 90, whereupon periodic actuation of blower 74 can then move the heated air into the lower portion of the reposed grain.

In operation, the present invention has the capability of providing more effective grain storage and drying at reduced costs as a very large installation can be readily constructed with a minimum of expensive materials. Grain from the field, other storage or whatever source, is loaded in through hopper 62 and carried up through vertical conveyor 64 whereupon the horizontal conveyor 66 is manipulated to down drop the grain at whatever position along the housing 10. Although complete filling of the storage housing 10 may take an extended period of time, drying and turning of grain can be commenced immediately as the incident sunlight through panels 54 provides heat application to the upper portions of the grain, and operation of the vertical conveyor 70 provides turning over of the grain by conveying grain from the apices 30 upward for release somewhere on top of the pile, as controlled from catwalk 50. In the event that additional heat application is necessary, one or more of blowers 74 and the attendant heat source can be utilized to force heated air via ducts 72 to the apices. All of the above manipulations, conveyances and/or forced air or heat application can be carried out simultaneously and adjustably to provide the optimum cyclical grain movement within storage housing 10, depending upon the degree of grain drying necessary for the particular batch of grain.

The foregoing discloses a novel method and apparatus for grain storage and drying which has extremely versatile capabilities and yet is a relatively lower cost and more easily constructed grain drying facility than those structures heretofore available. The similar form of structure can be erected in any of various sizes, from relatively small to very large with the capability of handling, turning and drying many tons of raw grain. While present design contemplates a housing structure on the order of one hundred eighty feet long by ninety feet wide, it should be understood that actual size and internal volume is no criterion so long as the tetrahedral bottom surfaces are maintained.

Changes may be made in the combination and arrangement of steps and elements as heretofore set forth in the specification and shown in the drawings; it being understood that changes may be made in the embodiments disclosed without departing from the spirit and scope of the invention as defined in the following claims.

What is claimed is:

1. A method for effecting storage and drying of grain, comprising:
   forming an earth cavity having planar equi-angular polyhedral characteristics wherein the slope angle of the planar surfaces relative to earth horizontal approximates the angle of repose of the grain;
   covering said earth cavity containing said grain with a ray transmissive covering to provide sun's heat to the grain; and
   gradually moving said grain from the apex of a tetrahedral earth cavity vertically upward and outward along the grain reposition surface for circulation back to the apex.

2. A method as set forth in claim 1 which is further characterized in that:
   said earth cavity consists of plural tetrahedral earth cavities disposed in serial alignment.

3. Apparatus for effecting storage and drying of grain, comprising:
   cavity means formed in the earth, said cavity means being formed as at least one regular polyhedron having a slope angle relative to earth horizontal which approximates the angle of repose of the grain;
   support means covering over said cavity means;
   cover panel means of radiant energy transmissive material affixed on said support means to enclose said cavity means;
   means for loading grain from the exterior of said cover panel means to the interior thereof;
   conveyance means in communication with said means for loading to controllably release the grain at a selected position at said cavity means; and
   vertical conveyance means extending from an apex of the polyhedral cavity upward for communication with said conveyance means.

4. Apparatus as set forth in claim wherein 3 said cavity means comprises:
   plural, serially aligned tetrahedral cavities.

5. Apparatus as set forth in claim 3 which is further characterized to include:
   grain directing means for controllably moving grain from said conveyance means to a selected position of said cavity means.

6. Apparatus as set forth in claim 3 which is further characterized to include:
   means for directing heated air for release within said grain; and
   means for continually moving said grain within its volume in repose to facilitate thorough drying of all the grain.

7. Apparatus as set forth in claim 6 wherein:
   said heated air is released at the apex of said regular polyhedron.

8. Apparatus as set forth in claim 6 which is further characterized to include:
   means for heating air and supplying said heated air to said means for directing.

9. Apparatus as set forth in claim 8 wherein said means for heating air comprises:
   second cavity means formed in the earth adjacent said cavity means;
   ray transmissive panel means covering said second cavity means; and
   conduit means communicating between said second cavity means and said cavity means.

10. A method as set forth in claim 1 which is further characterized to include the steps of:
    covering the total polyhedral surface of said earth cavity with waterproof material for receiving the grain thereupon.

11. Apparatus as set forth in claim 3 which is further characterized to include:
    relatively thin waterproofing means being disposed to cover said cavity means polyhedral surfaces.

12. Apparatus as set forth in claim 4 which is further characterized to include:
    relatively thin waterproofing means being disposed to cover said cavity means polyhedral surfaces.

* * * * *